(12) United States Patent
Clothier et al.

(10) Patent No.: US 7,741,612 B2
(45) Date of Patent: Jun. 22, 2010

(54) INTEGRATED NEUTRON-GAMMA RADIATION DETECTOR WITH OPTICAL WAVEGUIDE AND NEUTRON SCINTILLATING MATERIAL

(75) Inventors: Brent Allen Clothier, Niskayuna, NY (US); Daniel Bruno McDevitt, Schenectady, NY (US); Adrian Ivan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 101 days.

(21) Appl. No.: 12/027,828

(22) Filed: Feb. 7, 2008

(65) Prior Publication Data

US 2009/0200480 A1    Aug. 13, 2009

(51) Int. Cl.
*G01T 3/00*    (2006.01)
(52) U.S. Cl. .................................. 250/390.01
(58) Field of Classification Search ................................
250/390.01–390.12
See application file for complete search history.

(56) References Cited

U.S. PATENT DOCUMENTS

| | | | | |
|---|---|---|---|---|
| 2,920,204 A | * | 1/1960 | Youmans | ..................... 250/265 |
| 3,566,118 A | * | 2/1971 | Peters | ......................... 250/367 |
| 5,481,114 A | * | 1/1996 | Daniel et al. | ........... 250/390.11 |
| 6,707,047 B2 | * | 3/2004 | Craig et al. | ............. 250/390.04 |
| 7,238,951 B2 | * | 7/2007 | Disdier et al. | .......... 250/390.11 |
| 2005/0023479 A1 | * | 2/2005 | Grodzins | ................ 250/390.11 |
| 2007/0029493 A1 | | 2/2007 | Kniss et al. | |

FOREIGN PATENT DOCUMENTS

WO    2007/070859    6/2007

\* cited by examiner

*Primary Examiner*—David P Porta
*Assistant Examiner*—Kiho Kim
(74) *Attorney, Agent, or Firm*—Ann M. Agosti (57) ABSTRACT

An integrated neutron-gamma radiation detector includes a gamma sensing element, a neutron sensing element comprising a neutron scintillating material at least partially surrounded by an optical waveguide material, and a photosensing element optically coupled to both the gamma sensing element and the neutron sensing element. A portion of the gamma sensing element is capable of being disposed within a central aperture of the neutron sensing element. In one aspect, the neutron sensing element comprises a plurality of cylindrical, concentric shells forming the central aperture for receiving the gamma sensing element. In another aspect, the neutron sensing element comprises a plurality of strands forming a multi-layered structure and forming the central aperture for receiving the gamma sensing element.

20 Claims, 4 Drawing Sheets

INTEGRATED NEUTRON-GAMMA RADIATION DETECTOR WITH OPTICAL WAVEGUIDE AND NEUTRON SCINTILLATING MATERIAL

BACKGROUND OF THE INVENTION

1. Field of the Invention

The teachings herein relate to a detector of ionizing radiation and more particularly to a detector for detecting a gamma component and a neutron component.

2. Description of the Related Art

Detection of radioactive materials, particularly those illicitly hidden in the stream of commerce, requires the availability of a variety of radiation detection equipment. In particular, Hand-Held RadioIsotope Identification Devices (HHRIID) are needed in the field to quickly determine the presence of special nuclear material and distinguish it from the presence of medical and industrial radioisotopes, as well as from normally occurring radioactive material. One possible embodiment of an HHRIID consists of two optically separated radiation sensors that emit light and are coupled to a common photodetector. The first radiation sensor is a neutron sensing component that contains atomic nuclei with a high neutron cross section, such as $^6$Li in a chemical compound, such as $^6$LiF, surrounded by particles of a scintillator material, for example, ZnS:Ag, and bound together in an epoxy matrix. The second radiation sensor is a gamma sensing component and consists of a scintillator crystal with enhanced gamma energy resolution, high gamma stopping power, and an atomic composition with very low neutron absorption cross section. The two radiation sensors are optically separated in such a manner that the light emitted by one sensor does not reach the other sensor in order to avoid optical crosstalk. The HHRIID may include a pulse shape discrimination circuit that identifies the source of light emitted (either by the neutron sensing component or the gamma sensing component based on the difference in scintillation light decay times.)

In the detection of neutrons via solid-state scintillation, perhaps the most highly-utilized material stems from a granular mixture of $^6$LiF and ZnS:Ag. Each component in this mixture represents "best-of-class" performance (i.e., respectively, neutron capture and luminescence). For neutron capture, the LiF crystal structure offers one of the highest Li atom densities in solid-state form and maximizes the probability of neutron interaction, especially if in addition it is enriched in $^6$Li. Furthermore, the absorption of thermal neutrons by $^6$Li induces direct disintegration into alpha and triton particles with no other secondary radiation. The absence of multiple reaction pathways and/or radiation by-products enables one to optimize the corresponding phosphor to a single secondary radiation type (i.e., heavy charged particles). For luminescence, ZnS:Ag is one of the brightest phosphors known and remains unparalleled in its emission under alpha and triton exposure.

A crucial metric in determining the performance of a neutron scintillator is neutron sensitivity, the number of neutron events registered per incoming neutron flux. This measurement requires the collection and counting of photons from the neutron scintillator. However, the light output of $^6$LiF/ZnS:Ag materials is limited by two factors: [1] self-absorption of the emitted light by the ZnS:Ag phosphor, and [2] optical attenuation of the emission photons via scattering. The latter arises due to the granular nature of the material (i.e., the multitude of interfaces with index-of-refraction mismatches). The end result is a threshold in thickness beyond which further (useful) light output is unachievable.

Conventional neutron detection approaches typically rely on the optical coupling of a thin disk of $^6$LiF/ZnS:Ag composite (<1 mm) to the flat, circular face of a photosensor. For reasons stated above, the neutron sensitivity of this design cannot be improved by increasing the thickness of the disk. Instead, multiple layers of $^6$LiF/ZnS:Ag composite must be employed, which in turn, create substantial difficulties in transporting the resulting additional light to the photosensor (s). Furthermore, a flat disk may not be the desired shape for neutron capture. If an application requires the moderation of neutron energies (i.e., reduction to ambient, thermal energies), cylindrical shells are preferable to disks. For this geometry, the challenge of light transport becomes even more acute.

In order to improve the total neutron sensitivity of the detector while providing a design that reduces both the size and weight of the detector, an optimal integrated gamma/neutron detector must address the issue of packaging a larger area of neutron sensing composite.

BRIEF SUMMARY OF THE INVENTION

In one aspect, an integrated neutron-gamma radiation detector comprises a gamma sensing element; a neutron sensing element comprising a neutron scintillating material at least partially surrounded by an optical waveguide material, at least a portion of the gamma sensing element being disposed within a central aperture of the neutron sensing element; and a photosensing element optically coupled to both the gamma sensing element and the neutron sensing element.

In another aspect, an integrated neutron-gamma radiation detector comprises a gamma sensing element; a neutron sensing element comprising a neutron scintillating material at least partially surrounded by an optical waveguide material, at least a portion of the gamma sensing element being disposed within a central aperture of the neutron sensing element, wherein the neutron sensing element comprises a plurality of cylindrical, concentric shells forming the central aperture of the neutron sensing element; and a photosensing element optically coupled to both the gamma sensing element and the neutron sensing element.

In yet another aspect, an integrated neutron-gamma radiation detector, comprises a gamma sensing element; a neutron sensing element comprising a neutron scintillating material at least partially surrounded by an optical waveguide material, at least a portion of the gamma sensing element being disposed within a central aperture of the neutron sensing element, wherein the neutron sensing element comprises a plurality of strands; and a photosensing element optically coupled to both the gamma sensing element and the neutron sensing element.

A method of detecting radiation in an integrated neutron-gamma detector, the method comprises the steps of:

disposing a neutron scintillating material within an optical waveguide material to form a neutron sensing element;

disposing at least a portion of a gamma sensing element within the neutron sensing element; and optically coupling both the neutron sensing element and the gamma element to a photosensing element.

DETAILED DESCRIPTION OF THE INVENTION

Figure 1:
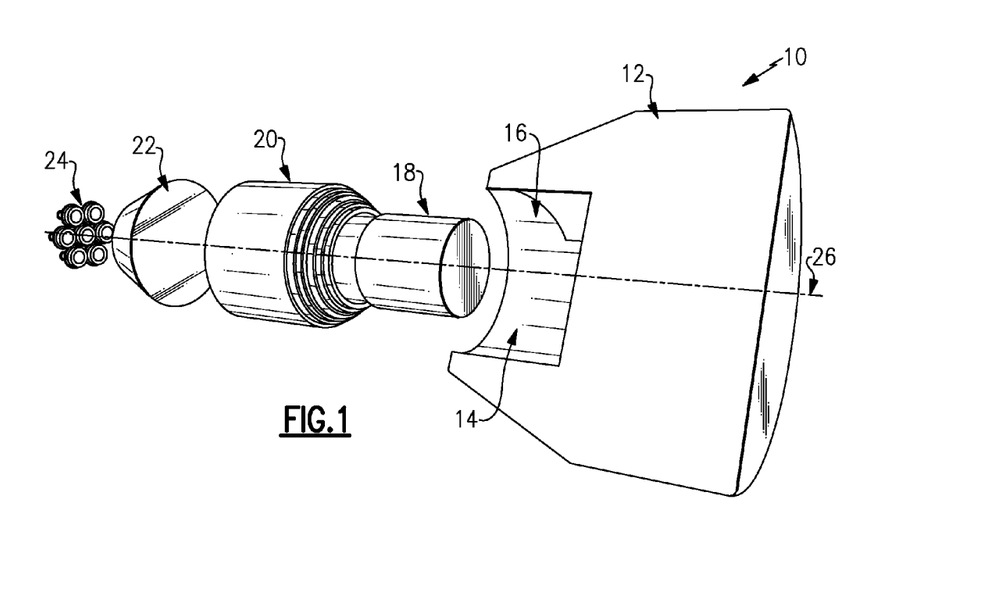
FIG. 1 is an exploded view of an integrated neutron/gamma detector including a neutron sensing element with an optical waveguide and neutron scintillating material according to an embodiment of the invention.
Figure 2:
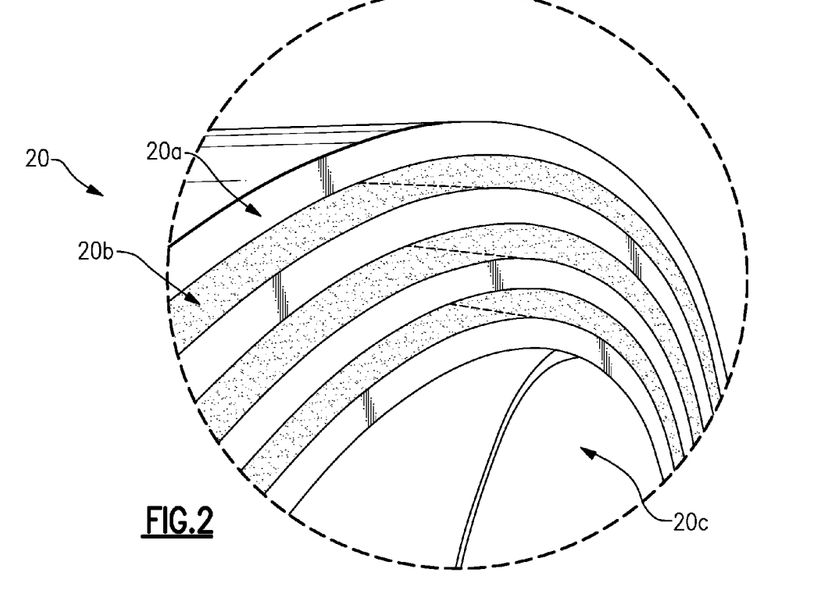
FIG. 2 is an exploded view of the neutron sensing element of the neutron/gamma detector of FIG. 1 according to an embodiment of the invention.
Figure 3:
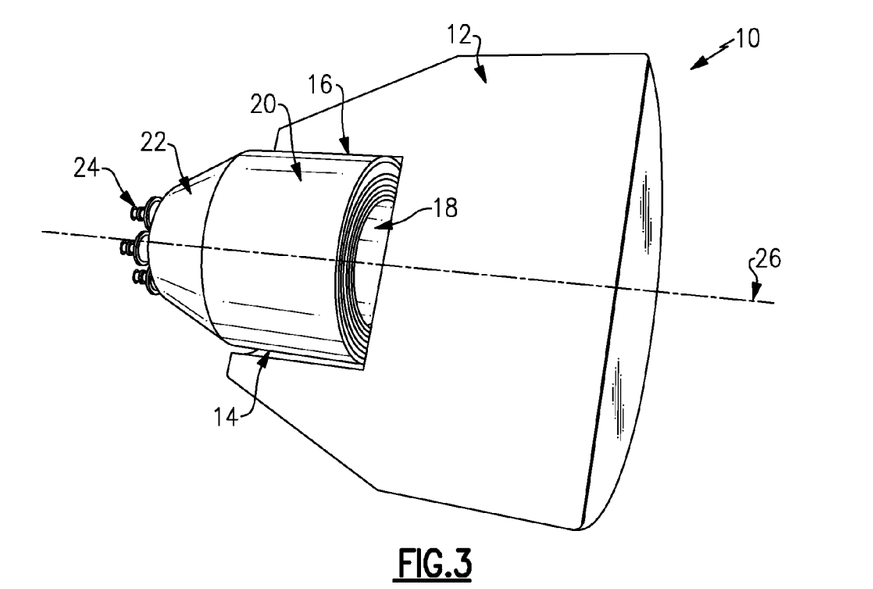
FIG. 3 is a perspective view of the integrated neutron/gamma detector of FIG. 1 when assembled.

Referring now to FIGS. 1-3, an integrated neutron-gamma radiation detector is shown generally at 10 according to an embodiment of the invention. At one end, the detector 10 includes a neutron moderator 12 that includes a material that slows down fast neutrons entering the moderator 12, but allowing thermal neutrons and gamma rays to easily pass therethrough. For example, the neutron moderator 12 may include hydrogen, and the like. The moderator 12 includes a cavity 14 that can be lined with an optical reflector material 16. A gamma sensing element 18 is disposed within the cavity 14 of the neutron moderator 12 and surrounded by another layer of the optical reflector 16 to increase the optical efficiency of the detector 10. In one embodiment, the gamma sensing element 18 comprises a scintillator crystal that emits a light pulse having a decay time, $\tau$, when a gamma ray collides with the gamma sensing element 18. Typical materials for the scintillator crystal include, without limitation, crystalline materials with high energy resolution (3% or better at 662 keV) from the Lanthanum halides class ($LaBr_3$, $LaCl_3$, $LaI_3$), as well as solid solutions of these materials. Other dense, bright and fast scintillator materials are useful for incorporation into the gamma sensor 18 as well. For example, the scintillator crystal may be made of a mixed lanthanum halide $LaX_3$:Ce (X=Cl, Br, I) gamma scintillator material that emits a light pulse having a decay time, $\tau_1$, of about 20 nanoseconds. The mixed lanthanum halides $LaX_3$:Ce (X=Cl, Br, I) gamma scintillator material has outstanding energy resolution that will consequently enable high-performance room temperature detectors at considerably lower cost when compared to current technologies, such as cryogenically cooled high purity Germanium (HP Ge).

The detector 10 includes a neutron sensing element 20 that is disposed within the cavity 14 of the neutron moderator 12. In the illustrated embodiment, the neutron sensing element 20 is disposed proximate the gamma sensing element 18 such that at least a portion of the gamma sensing element 18 is disposed within the neutron sensing element 20 for a spatially-compact design, as shown in FIG. 3. The optical reflector material 16 is used in layers that surround both the neutron sensing element 20 and the gamma sensing element 18 to provide an optically efficient design.

The detector 10 also includes a photosensing element or array of photosensing elements 24, such as a photodiode or photomultiplier tube (PMT), and the like, which is optically coupled to the gamma sensing element 18 and the neutron sensing element 20. In the illustrated embodiment, a light collector 22 is disposed between the photosensing element 24 and the gamma sensing element 18 and the neutron sensing element 20. The collector 22 is made of an optically transparent material, such as epoxy, plastic, glass, and the like. The purpose of the collector 22 is to act as a lens and funnel the photons emitted from the gamma sensing element 18 and neutron sensing element 20, which have a relatively large diameter, into the photosensing element 24, which typically has a relatively smaller diameter, and increase the optical efficiency of the detector 10. The collector 22 may be surrounded by an optical reflector (not shown), if necessary, to further increase the optical efficiency of the detector 10. It will be appreciated that the collector 22 can be eliminated when the relative diameters of the gamma and neutron sensing elements 18, 20 are approximately equal to the diameter of the photosensing element 24.

It will be appreciated that the invention can be practiced with any suitable photosensor acting as the photosensing element, and that the use herein of the photodiode or PMT as a photosensor is merely illustrative and non-limiting. The photosensing element 24 outputs a signal, S, indicative by its decay time characteristic of the two different types of photons emitted by the gamma sensing element 18 and the neutron sensing element 20. Thus, detector 10 needs only a single photosensing element 24 to detect the two different types of light pulses emitted by the gamma and neutron sensing elements 18, 20.

Although in the illustrated embodiment the integrated detector 10 includes an array of photodiodes as the photosensing element 24, the detector 10 may comprise other photosensitive devices. For example, other embodiments of the detector 10 may include a photomultiplier tube, a PIN photodiode, an avalanche photodiode, a Geiger-mode operating photodiode, a hybrid photodetector and other similar devices, operating either individually or grouped as an array. In short, the photosensing element 24 is designed to receive and interpret a signal from each of the gamma sensing element 18 and the neutron sensor element 20 (each of the gamma sensing element 18 and the neutron sensing element 20 being a scintillator and providing and optical output in response to a radiation interaction). To interpret such signals, the detector 10 may also include a pulse shaping and processing electronics package (not shown) of a type well-known in the art that processes the signal, S, from the photosensing element 24 to determine whether a given photon-emitting event is indicative of radiation interaction in the gamma sensing element 18 or in the neutron sensor element 20. In the case of gamma rays, the electronics also determine the energy of the gamma ray based on the amount of charge generated in the photosensing element 24 and a calibration procedure with known gamma ray energies from radioisotopic sources. For example, the pulse shape and process electronics package may include an analog-to-digital converter (ADC) and also a charge [Q] to digital converter (QDC) (not shown) that receive the signal, S, from the photosensing element 24. Each signal, S, is indicative of a radiation interaction in one of the gamma sensing element 18 and the neutron sensing element 20, and has a signal amplitude $V_0$.

Referring now to FIG. 2, one aspect of the invention is that the neutron sensing element 20 comprises an optical waveguide material 20a surrounding a neutron scintillating material 20b, and a central aperture 20c of sufficient dimension such that at least a portion of the gamma sensing element 18 is capable of being disposed therein. In an embodiment, the optical waveguide material 20a may be made of, for example, fused/glassy silica, transparent plastic, and the like. For example, the optical waveguide material 20a may comprise an optical waveguide of a type well-known in the art. The neutron scintillating material 20b may comprise, for example, a mixture of particles of a neutron capture material, for example, $^6$Li in a chemical compound form, such as $^6$LiF, and a scintillator material, such as ZnS:Ag, both in an optically transparent epoxy matrix.

The neutron scintillator material has a relatively large cross section (940 barns per Li $^6$atom) for thermal neutrons. Upon absorption of a thermal neutron, $^6$Li decays into $^3$H and emits an alpha particle, both charged particles with a total kinetic energy of about 4.8 MeV. The alpha particle and the triton are absorbed by the scintillator material, such as ZnS:Ag, which emits a 450 nm photon having a decay time, $\tau_2$, of about 110 nanoseconds, which is different than the decay time, $\tau_1$, of the photons emitted from the scintillator crystal of the gamma sensing element 18. An optimum radius or thickness is utilized to maximize the photon flux exiting the surface area of the neutron scintillating material 20b. For example, the radius of a very thin shell of $^6$LiF/ZnS:Ag composite material would be selected to maximize internal light generation, and the thickness of the cylindrical shell would be chosen to optimize emissions from the exterior and interior surfaces.

It will be appreciated that the invention is not limited to using $^6$LiF/ZnS:Ag as the neutron scintillating material, and that other neutron scintillating materials can be disposed within the optical waveguide. These materials may include compositions in which both the neutron capture and luminescence functions are embodied within a single composition (i.e., not two as in the case of $^6$LiF and ZnS:Ag). For example, liquid or plastic neutron scintillating materials containing $^6$Li, $^{10}$B, $^{157}$Gd, and the like, are suitable candidates as neutron scintillating materials.

As described above, interaction of the alpha particle and triton with the scintillator material, such as ZnS:Ag, provides for photon emission from the neutron scintillating material 20b. Accordingly, although other phenomena may be included or potentially influence signals generated by the LiF/ZnS:Ag component, it should be recognized that the use of "neutron sensor" accounts for the various aspects and mechanisms that provide for or are attendant with neutron detection, and therefore the term "neutron sensor" is not to be limited by the various aspects and mechanisms.

In the illustrated embodiment, the neutron sensing element 20 comprises a plurality of concentric cylindrical rings or shells of alternating optical waveguide and neutron scintillating material. The rings or shells of material are extended along and are substantially aligned with a longitudinal axis 26 of the detector 10. However, it will be appreciated that the invention is not limited to a particular configuration for the neutron sensing element 20 and that many possible configurations for the neutron sensing element 20 are within the scope of the invention. In one example, the neutron sensing element 20 has an innermost shell of optical waveguide material 20a followed by alternating shells of neutron scintillating material 20b and waveguide material 20a, and an outermost shell of waveguide material 20a. In another example, the neutron sensing element 20 has an innermost solid "core" of either optical waveguide material 20a or neutron scintillating material 20b followed by alternating shells of optical waveguide material 20a and waveguide material 20b, and an outermost shell of waveguide material 20a (i.e., without the central aperature of 20c); in this latter case, it is not required that the gamma sensing element 18 be disposed within the central aperture 20c of the neutron sensing element 20.

It will also be appreciated that the invention is not limited by the number and thickness of the alternating shells of waveguide material and neutron scintillating material, and that the number and thickness of the shells can be varied as needed. For example, the neutron sensing element 20 may comprise of only three shells of material, e.g., a shell of neutron scintillating material 20b disposed between an innermost and an outermost shell of optical waveguide material 20a. It will also be appreciated that the invention is not limited by the use of alternating layers, and that the invention can be practiced with non-alternating layers of optical waveguide material and neutron scintillating material.

Because the optical waveguide 20a surrounds the neutron scintillation material 20b, the photon emitted by the neutron sensing material 20b is collected and channeled to the end of the optical waveguide material 20a. The photosensing element 24, which is optically coupled to the neutron sensing element 20, then detects the photon as a neutron event. To enhance internal reflection of the photon, the optical waveguide material 20a should have (ideally) a refractive index greater than that of the neutron scintillating material 20b. If needed, the surfaces of the optical waveguide material 20a may be coated with a thin reflective layer (not shown) to induce a "one-way mirror" effect to improve internal reflection. Ideally, the optical waveguide material 20a should also have a very high transmission (>90%) at the wavelength of the neutron scintillating material 20b. It is appreciated that the thickness of the optical waveguide material 20a and the thickness and diameter of the core of neutron scintillating material 20b can be optimized to maximize the amount of photons collected by the waveguide material 20a and ultimately interpreted as an event.

Figure 4:
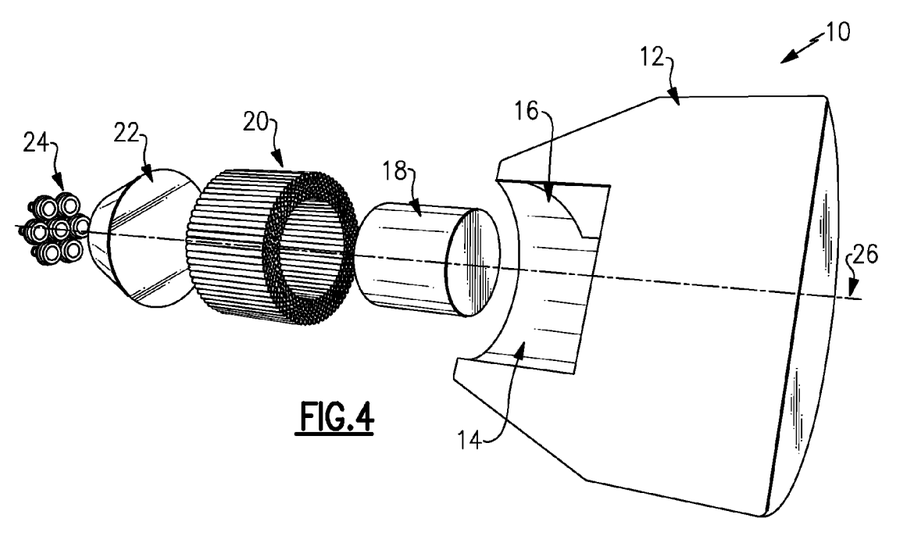
FIG. 4 is an exploded view of an integrated neutron/gamma detector including a neutron sensing element with an optical waveguide and neutron scintillating material according to another embodiment of the invention.
Figure 5:
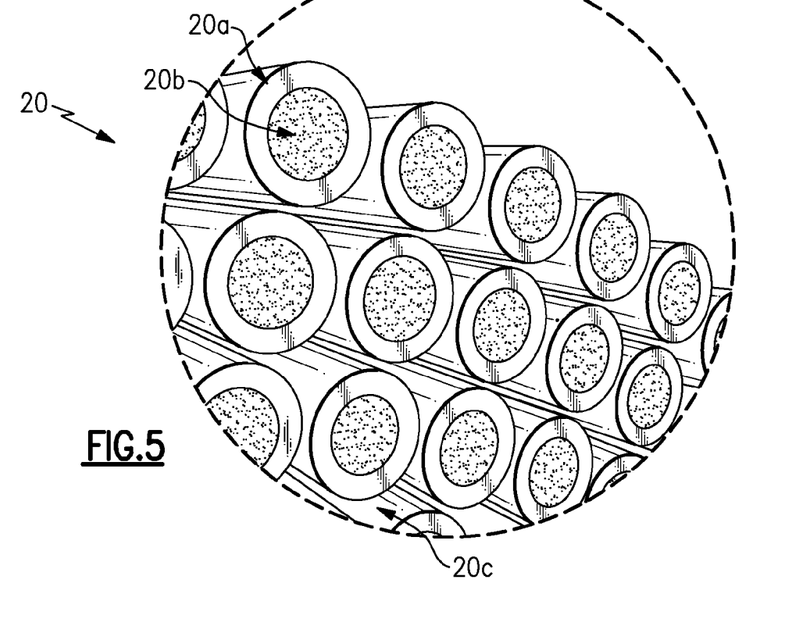
FIG. 5 is an exploded view of the neutron sensing element of the neutron/gamma detector of FIG. 4 according to another embodiment of the invention.
Figure 6:
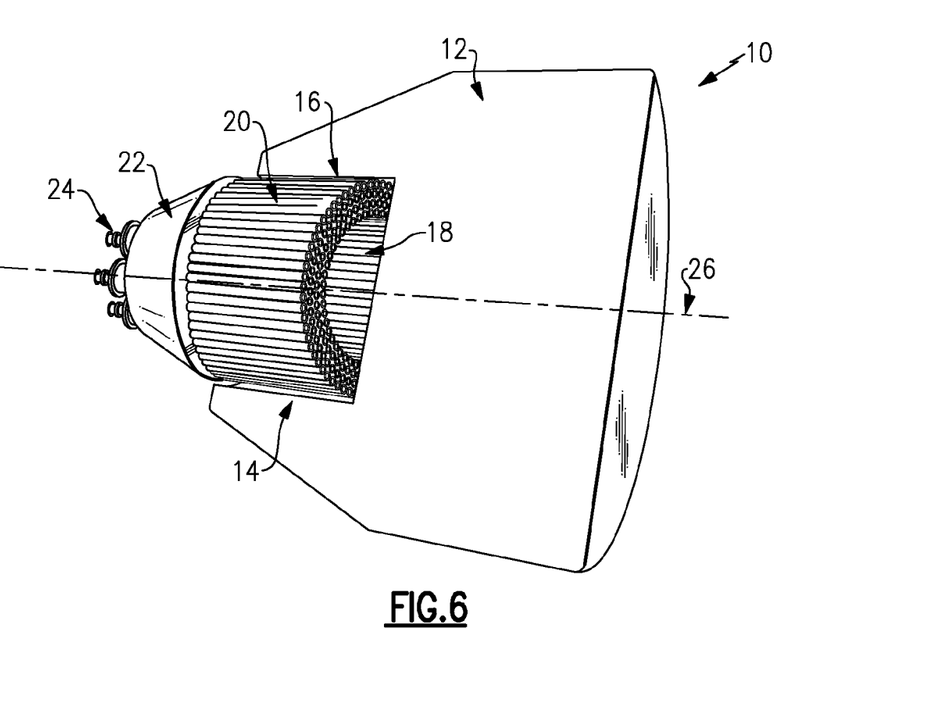
FIG. 6 is a perspective view of the integrated neutron/gamma detector of FIG. 4 when assembled.

Referring now to FIGS. 4-6, another configuration of the neutron sensing element 20 of the detector 10 is shown. In this embodiment, the neutron sensing element 20 comprises a plurality of "strands" of the neutron scintillating material 20b disposed within the interior of an annular or tubular optical waveguide material 20a. The "strands" extend along and are substantially aligned with the longitudinal axis 26 of the detector 10 to form a multi-layered structure having the central aperture 20c such that at least a portion of the gamma sensing element 18 can be disposed therein, similar to the cylindrical shell of the neutron sensing element 20 shown in FIGS. 1-3. The "strands" may also form the neutron sensing element 20 with a solid core (without the central aperture 20c) in the case where it is not required that the gamma sensing element 18 be disposed within the central aperture 20c of the neutron sensing element 20.

It will be appreciated that the invention is not limited by the number of layers of "strands" to form the neutron sensing element 20, and that the invention can be practiced with an optimal number of layers for photon collection and transmission to the photosensing element 24.

Figure 7:
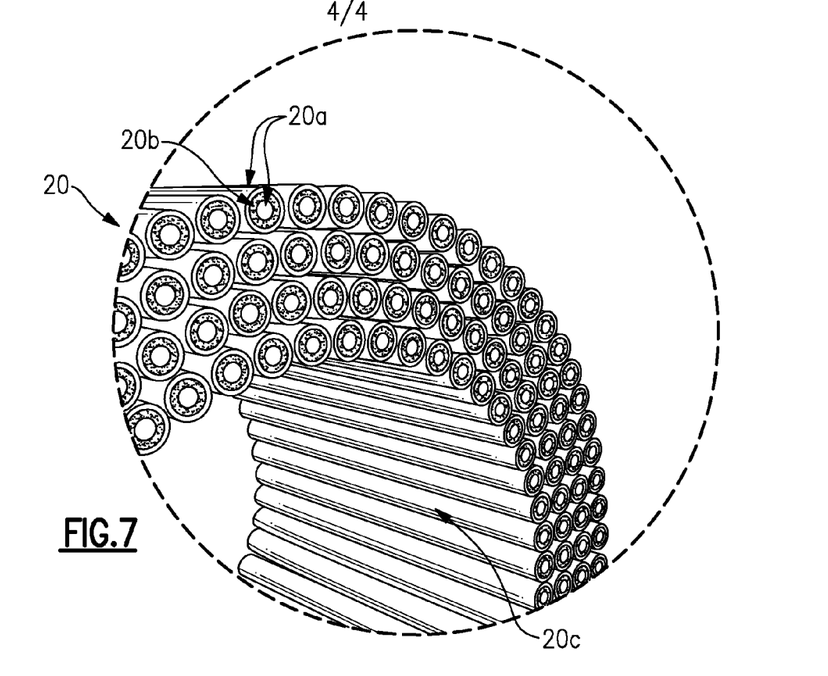
FIG. 7 is a cross-sectional view of strands of the neutron sensing element according to an alternate embodiment of the invention.
Figure 8:
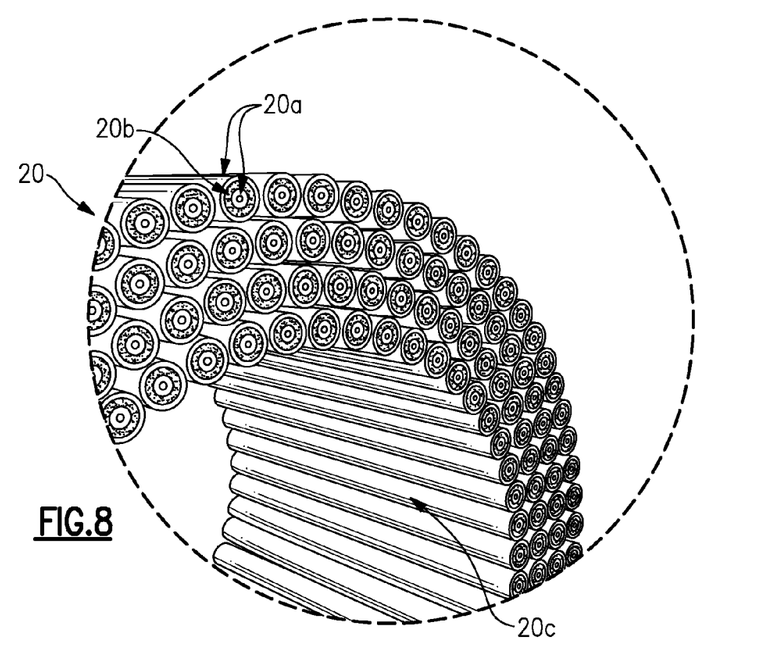
FIG. 8 is a cross-sectional view of strands of the neutron sensing element according to another alternate embodiment of the invention.

In the embodiment shown in FIG. 5, each "strand" of the neutron sensing element 20 comprises a cylindrical tube of optical waveguide material 20a and a solid "core" of neutron scintillating material 20b disposed within the cylindrical tube of optical waveguide material 20a. However, it should be understood that the invention is not limited to the configuration for each "strand" of the neutron sensing element 20 and that many configurations are within the scope of the invention. For example, the "strands" of neutron sensing element 20 can comprise an outer, cylindrical shell of optical waveguide material 20a and an innermost concentric solid "core" of optical waveguide material 20a wherein a neutron scintillating material 20b is disposed between the shell and "core", as shown in FIG. 7. In an alternate embodiment, the "strands" of neutron sensing element 20 can comprise two concentric, cylindrical shells of optical waveguide material 20a and a neutron scintillating material 20b disposed between the two shells, as shown in FIG. 8.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An integrated neutron-gamma radiation detector, comprising:
   a gamma sensing element;
   a neutron sensing element comprising a neutron scintillating material at least partially surrounded by an optical waveguide material, at least a portion of the gamma sensing element being disposed within a central aperture of the neutron sensing element; and
   a photosensing element optically coupled to both the gamma sensing element and the neutron sensing element,
   wherein photons emitted from the neutron sensing element are collected and channeled through the optical waveguide material and into the photosensing element.

2. The detector according to claim 1, wherein the neutron sensing element comprises a plurality of cylindrical, concentric shells forming the central aperture of the neutron sensing element.

3. The detector according to claim 2, wherein at least one shell of the plurality of cylindrical shells is substantially aligned along a longitudinal axis of the detector.

4. The detector according to claim 1, wherein the neutron sensing element comprises a plurality of strands.

5. The detector according to claim 4, wherein the plurality of strands form a layered structure forming the central aperture of the neutron sensing element.

6. The detector according to claim 4, wherein each strand comprises a solid core of the neutron scintillating material disposed within the optical waveguide material.

7. The detector according to claim 4, wherein each strand comprises a plurality of cylindrical, concentric shells.

8. The detector according to claim 4, wherein at least one strand of the plurality of strands is substantially aligned along a longitudinal axis of the detector.

9. The detector according to claim 1, wherein the optical waveguide material comprises an optical waveguide.

10. An integrated neutron-gamma radiation detector, comprising:
    a gamma sensing element;
    a neutron sensing element comprising a neutron scintillating material at least partially surrounded by an optical waveguide material, at least a portion of the gamma sensing element being disposed within a central aperture of the neutron sensing element, wherein the neutron sensing element comprises a plurality of cylindrical, concentric shells forming the central aperture of the neutron sensing element; and
    a photosensing element optically coupled to both the gamma sensing element and the neutron sensing element,
    wherein photons emitted from the neutron sensing element are collected and channeled through the optical waveguide material and into the photosensing element.

11. The detector according to claim 10, wherein the plurality of cylindrical shells are substantially aligned with a longitudinal axis of the detector.

12. The detector according to claim 10, wherein the neutron scintillating material and the optical waveguide material alternate between each shell of the plurality of cylindrical shells.

13. The detector according to claim 10, wherein the optical waveguide material comprises an optical waveguide.

14. An integrated neutron-gamma radiation detector, comprising:
    a gamma sensing element;
    a neutron sensing element comprising a neutron scintillating material at least partially surrounded by an optical waveguide material, at least a portion of the gamma sensing element being disposed within a central aperture of the neutron sensing element, wherein the neutron sensing element comprises a plurality of strands; and
    a photosensing element optically coupled to both the gamma sensing element and the neutron sensing element,
    wherein photons emitted from the neutron sensing element are collected and channeled through the optical waveguide material and into the photosensing element.

15. The detector according to claim 14, wherein the plurality of strands form a layered structure forming the central aperture of the neutron sensing element.

16. The detector according to claim 14, wherein each strand comprises a solid core of the neutron scintillating material disposed within the optical waveguide material.

17. The detector according to claim 14, wherein each strand comprises a plurality of cylindrical, concentric shells.

18. The detector according to claim 14, wherein at least one strand of the plurality of strands is substantially aligned along a longitudinal axis of the detector.

19. The detector according to claim 14, wherein the optical waveguide material comprises an optical waveguide.

20. A method of detecting radiation in an integrated neutron-gamma detector, the method comprising the steps of:
    disposing a neutron scintillating material within an optical waveguide material to form a neutron sensing element;
    disposing at least a portion of a gamma sensing element within the neutron sensing element; and
    optically coupling both the neutron sensing element and the gamma element to a photosensing element,
    whereby photons emitted from the neutron sensing element are collected and channeled through the optical waveguide material and into the photosensing element.

* * * * *

UNITED STATES PATENT AND TRADEMARK OFFICE
CERTIFICATE OF CORRECTION

PATENT NO.        : 7,741,612 B2
APPLICATION NO.   : 12/027828
DATED             : June 22, 2010
INVENTOR(S)       : Clothier et al.

It is certified that error appears in the above-identified patent and that said Letters Patent is hereby corrected as shown below:

Substitute the Fig 7 with the attached Fig. 7
(In Fig. 7, Sheet 4 of 4, above Tag "20a" delete "4/4").

Signed and Sealed this

Thirtieth Day of November, 2010

David J. Kappos
*Director of the United States Patent and Trademark Office*

FIG.7

FIG.8